United States Patent
Nakamura

[11] 3,756,697
[45] Sept. 4, 1973

[54] AUTO-FOCUSING OPTICAL SYSTEM
[75] Inventor: Soichi Nakamura, Kamakura-ken, Japan
[73] Assignee: Nippon Kogaku K.K., Chiyoda-ku, Tokyo, Japan
[22] Filed: Mar. 31, 1972
[21] Appl. No.: 240,213

[30] Foreign Application Priority Data
Apr. 16, 1971 Japan................................ 46/23900

[52] U.S. Cl..................... 350/202, 95/42, 350/172, 350/214
[51] Int. Cl......................... G02b 9/64, G02b 27/10
[58] Field of Search.................... 350/202, 214, 171, 350/172; 95/42

[56] References Cited
UNITED STATES PATENTS
3,385,190  5/1968  Sho et al................................ 95/42
3,232,197  2/1966  Kasahara...................... 350/202 UX
2,503,789  4/1950  Wood et al. ........................ 350/255
3,612,663  10/1971 Tronnier et al..................... 350/214

Primary Examiner—John K. Corbin
Attorney—Joseph M. Fitzpatrick, John Thomas Cella et al.

[57] ABSTRACT

An automatic focusing optical system having a range determining system and a photo-taking system. The photo-taking system is divided into two groups with a beam splitter interposed therebetween. The range determining system has its forward group provided by the whole or part of the forward group of the photo-taking system and has its rearward group disposed in the path of light reflected by the beam splitter. All or part of the rearward group of the photo-taking system is axially moved for focusing the photo-taking system.

3 Claims, 8 Drawing Figures

ABERRATIONS OF PHOTOTAKING LENS

OBJECT DISTANCE INFINITE
SPHERICAL ABERRATION ——

OBJECT DISTANCE 1.5M
SINE CONDITION ----

ASTIGMATISM

DISTORSION

ABERRATIONS OF RANGE
DETERMINING LENS

SPHERICAL ABERRATION ——    SINE CONDITION - - - -

AUTO-FOCUSING OPTICAL SYSTEM

BACKGROUND OF THE INVENTION

1. Field of the Invention

This invention relates to an optical system for the so-called self-focusing camera in which a photoelectric element is moved back and forth to find a position where the image of a range determining optical system is sharpest, whereafter an electric logic circuit and an analog circuit are used to calculate the amount of axial movement to be imparted to a photo-taking lens in accordance with said position and the current position of the photo-taking lens so that a servo-motor is driven in accordance with the result of the calculation to automatically move the photo-taking lens for effecting the focusing.

2. Description of the Prior Art

In constructing the optical system for the camera of the described type, there comes to mind a twin-lens camera having a photo-taking lens system constructed in parallel relationship with respect to a range finder system.

In such a twin-lens camera, the presence of the two entirely discrete lens systems leads to an increased size of the entire camera structure and, in addition, the parallax occurring between the photo-taking lens and the range finder lens necessitates the provision of a correction mechanism.

The problem of parallax mibht be avoided by constructing the camera as a single-lens reflex type. However, if the type is used in which a beam splitter is disposed in front of the photo-taking lens, the beam splitter must have a large diameter in order to prevent the oblique rays passing through the photo-taking lens from being turned down. Reduction in the size of the beam splitter might be reailized by incorporating it in the interior of the photo-taking lens system. This, however, presents a problem in that the beam splitter is moved together with the photo-taking lens when the latter is axially moved for focusing, and thus complicates its operative association with the range determining system. Also, in the triplet type lens or in a zoom lens, which involves axial movement of the foremost lens element, the interlocking mechanism for the range determining system will still be complicated and, thus, impractical.

SUMMARY OF THE INVENTION

In order to overcome the problems encountered with the prior art, the present invention provides a photo-taking lens system which is divided into forward and rearward groups, with a beam splitter interposed therebetween. The focusing of the photo-taking lens is achieved by axially moving all or part of the rearward group thereof.

This leads to compactness of the beam splitter which is mounted adjacent the diaphragm, and accordingly, reduces the dimensions of the optical system, even if use is made of a semi-transparent mirror or prism, or of a hollow mirror having a transparent center portion.

On the other hand, the entire system is simplified because the focusing of the photo-taking lens is achieved by axially moving only the rearward group of the photo-taking lens system mounted independently of the rearward group of the range determining system. Moreover, the range determining system is provided as part of the forward group of the photo-taking lens system, and this, in turn, leads to the compactness of the optical system and, accordingly, of the entire camera.

It will thus be appreciated that the present invention provides a compact self-focusing camera.

BRIEF DESCRIPTION OF THE DRAWINGS

The invention will become fully understood from the following description of an embodiment thereof taken in conjunction with the accompanying drawings, in which.

DESCRIPTION OF THE PREFERRED EMBODIMENT

Figure 1:
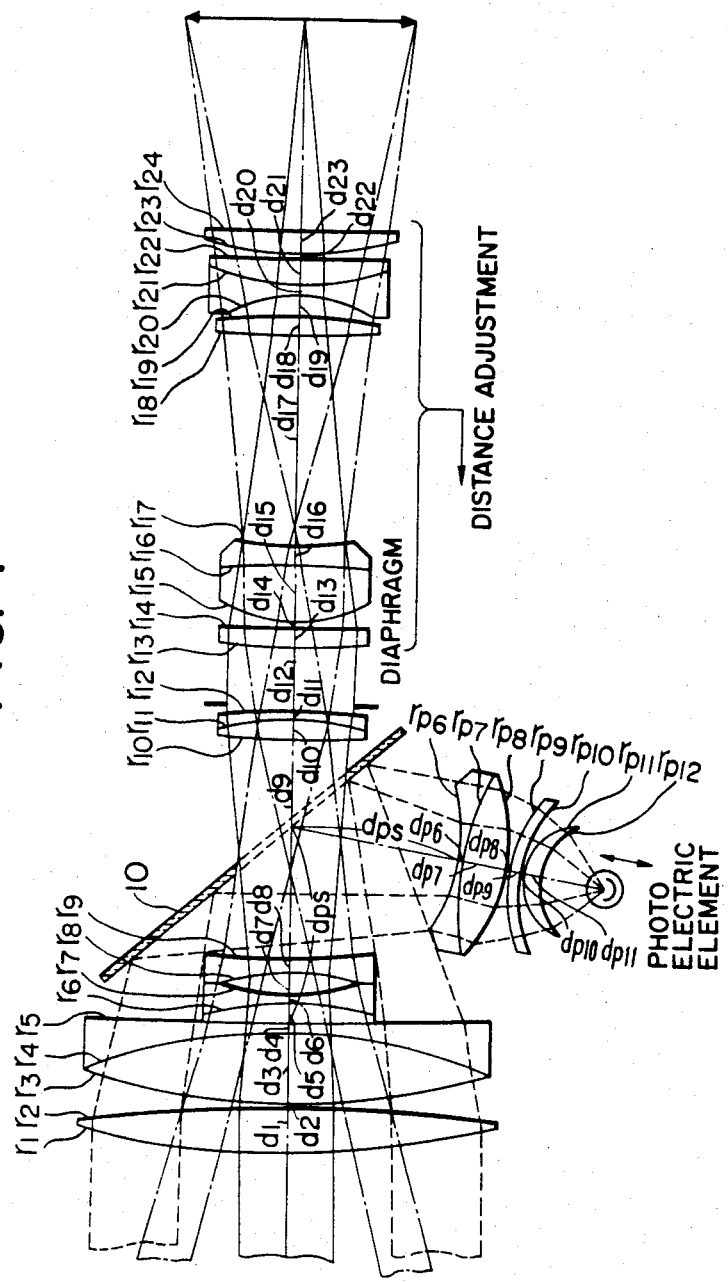
FIG. 1 is a side elevational view showing the construction according to one embodiment of the present invention.
Figure 2A:
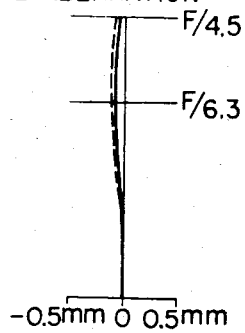
FIGS. 2a to 2f show a series of graphs illustrating various aberrations which occur when the object distance from the photo-taking lens in the embodiment of FIG. 1 is at infinity and at 1.5 m, respectively.
Figure 2B:
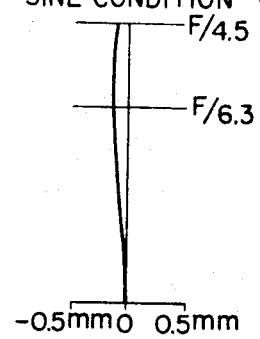
Figure 2C:
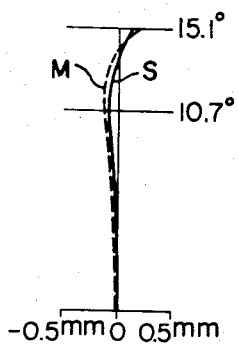
Figure 2D:
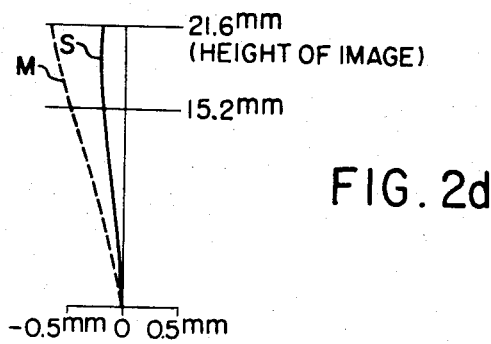
Figure 2E:
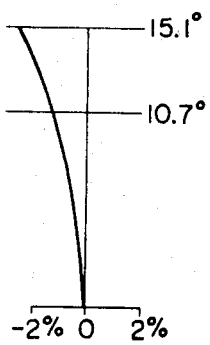
Figure 2F:
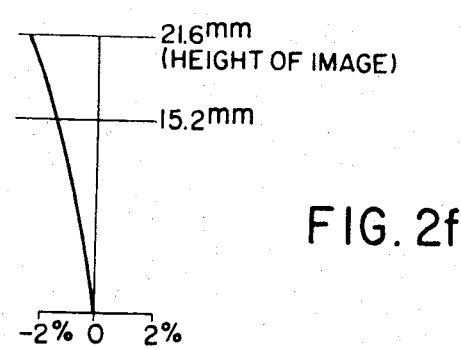

Referring to the embodiment of the present invention shown in FIG. 1, the photo-taking lens system comprises a forward group designated by $r_1$ to $r_9$ inclusive, and a rearward group designated by $r_{10}$ to $r_{24}$, inclusive. The range finder system is provided by part of the forward group, i.e., $r_1$ to $r_5$. A beam splitter 10, which is in the form of a hollow mirror, is interposed between the forward and the rearward group of the photo-taking lens system so as to reflect object light downwardly to a group of lens elements disposed below the beam splitter to focus the image of the object therethrough.

Range finding is achieved by moving part of the rearward group such as $r_{13}$ to $r_{24}$ axially forward in the system.

The data of the embodiment is shown in the table below, wherein $r_1, r_2 \ldots r_n$ represents the radii of curvature of the sucessive lens elements, $d_1, d_2 \ldots d_{n-1}$ the center thicknesses or the intervertex air spaces of the successive lens elements, $n_1, n_2 \ldots n_k$ the refractive indices of the respective glass materials for $d$-line, and $v_1, v_2 \ldots v_k$ the Abbe numbers of the respective glass materials.

Figure 3:
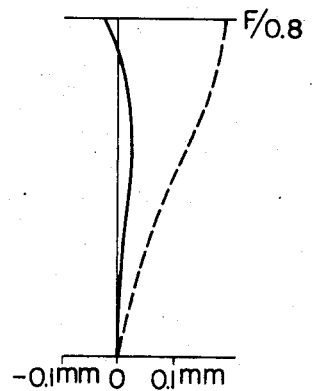
FIG. 3 is a graph showing the spherical aberration and sine condition when the object distance from the range finder system in the embodiment of FIG. 1 is at infinity.

Various aberrations are shown in FIG. 2, which occur when the object distance from the photo-taking lens in the illustrated embodiment of the present invention is infinite and 1.5m. Curves M and S in the astigmatism graphs represent meridional beam and sagittal beam, respectively. Spherical aberrations and sine conditions for the infinite object distance from the range finder system are illustrated in FIG. 3.

EXAMPLE

Photo-taking Lens:
Focal length $f = 80$mm, relative aperture F/4.5, for use with a still camera; wherein:

| | | | |
|---|---|---|---|
| $r_1 = 174.94$ | $d_1 = 7.5$ | $n_1 = 1.62299$ | $v_1 = 58.1$ |
| $r_2 = -362.34$ | $d_2 = 0.1$ | | |
| $r_3 = 135.09$ | $d_3 = 13.5$ | $n_2 = 1.60311$ | $v_2 = 60.7$ |
| $r_4 = -104.02$ | $d_4 = 2.0$ | $n_3 = 1.75520$ | $v_3 = 27.5$ |
| $r_5 = 10000.00$ | | | |

| | $d_6=3.7$ | $n_4=1.69895$ | $\nu_4=30.0$ |
|---|---|---|---|
| $r_6=-42.672$ | $d_6=1.0$ | $n_5=1.5168$ | $\nu_5=64.2$ |
| $r_7=50.88$ | $d_7=4.4$ | | |
| $r_8=-43.756$ | $d_8=1.2$ | $n_6=1.62041$ | $\nu_6=60.3$ |
| $r_9=142.270$ | $d_9=39.538$ | | |
| $r_{10}=-121.42$ | $d_{10}=4.0$ | $n_7=1.62041$ | $\nu_7=60.3$ |
| $r_{11}=-48.713$ | $d_{11}=1.0$ | $n_8=1.62004$ | $\nu_8=36.3$ |
| $r_{12}=-148.14$ | $d_{12}=10.877$ | | |
| $r_{13}=80.803$ | $d_{13}=4.7$ | $n_9=1.54814$ | $\nu_9=45.9$ |
| $r_{14}=-1347.294$ | $d_{14}=0.7$ | | |
| $r_{15}=32.37$ | $d_{15}=10.4$ | $n_{10}=1.53172$ | $\nu_{10}=48.9$ |
| $r_{16}=-209.947$ | $d_{16}=2.8$ | $n_{11}=1.7847$ | $\nu_{11}=26.1$ |
| $r_{17}=44.615$ | $d_{17}=38.1$ | | |
| $r_{18}=137.03$ | $d_{18}=3.8$ | $n_{12}=1.62041$ | $\nu_{12}=60.3$ |
| $r_{19}=-71.03$ | $d_{19}=3.0$ | | |
| $r_{20}=-31.35$ | $d_{20}=1.5$ | $n_{13}=1.744$ | $\nu_{13}=44.9$ |
| $r_{21}=40.00$ | $d_{21}=4.9$ | $n_{14}=1.69895$ | $\nu_{14}=30.0$ |
| $r_{22}=-1595.00$ | $d_{22}=0.1$ | | |
| $r_{23}=62.328$ | $d_{23}=4.0$ | $n_{15}=1.70154$ | $\nu_{15}=41.1$ |
| $r_{24}=2466.00$ | | | |

Range Finder Lens;
Focal length $f = 50$mm, relative aperture F/0.8
($r_1-r_5$ are common to the photo-taking lens and the range finder lens)

| | $d_1=7.5$ | $n_1=1.62299$ | $\nu_1=58.1$ |
|---|---|---|---|
| $r_1=174.94$ | | | |
| $r_2=-362.34$ | $d_2=0.1$ | | |
| $r_3=135.09$ | $d_3=13.5$ | $n_2=1.60311$ | $\nu_2=60.7$ |
| $r_4=-104.02$ | $d_4=2.0$ | $n_3=1.75520$ | $\nu_3=27.5$ |
| $r_5=10000.00$ | | | |
| $rp_6=-28.00$ | $dp_5=67.0$ | | |
| $rp_7=60.00$ | $dp_6=1.0$ | $n_4=1.68893$ | $\nu_4=31.1$ |
| $rp_8=-28.989$ | $dp_7=8.0$ | $n_5=1.691$ | $\nu_5=54.8$ |
| $rp_9=22.00$ | $dp_8=0.1$ | | |
| $rp_{10}=25.287$ | $dp_9=4.0$ | $n_6=1.74443$ | $\nu_6=49.4$ |
| $rp_{11}=10.25$ | $dp_{10}=0.1$ | | |
| $rp_{12}=12.104$ | $dp_{11}=3.2$ | $n_7=1.80482$ | $\nu_7=46.4$ |

I claim:

1. An automatic focusing optical system comprising a main photo-taking optical system formed to be an inverted telephoto lens, consisting of
   a front divergent lens group including at least one positive member and at least one negative member, the diameter of said positive member being larger than that of said negative member, and
   a first rear convergent lens group axially movable for focusing the image of the object; and
   a focused range determining optical system for forming the object image on a photoresponsive element including a second rear convergent lens group located in front of the photoresponsive element and an apertured inclined mirror placed between said front divergent lens group and said first rear convergent lens group for directing a part of the light rays from the object to the optical axis of said second convergent lens group,
   whereby the light rays from the object, passing through the negative member of the front divergent lens group and the aperture of said mirror, are focused by said first rear convergent lens group, and the light rays from the object, passing through the peripheral portion of said positive member outside of said negative member are reflected by the reflecting surface of said mirror toward said second convergent lens group.

2. An automatic focusing optical system according to claim 1, wherein said first rear group includes a stop and three convergent components, the first component thereof being positioned between said mirror and said stop,
   thereby the remaining second and third positive components of said three components are axially moved in unison for focusing.

3. An automatic focusing optical system according to claim 2, wherein:
   a photo-taking lens is characterized by:
   A photo-taking lens is characterized by:
   a focal length $f = 80$mm, relative aperture F/4.5, for use with a still camera;
   wherein:

| | $d_1=7.5$ | $n_1=1.62299$ | $\nu_1=58.1$ |
|---|---|---|---|
| $r_1=174.94$ | | | |
| $r_2=-362.34$ | $d_2=0.1$ | | |
| $r_3=135.09$ | $d_3=13.5$ | $n_2=1.60311$ | $\nu_2=60.7$ |
| $r_4=-104.02$ | $d_4=2.0$ | $n_3=1.75520$ | $\nu_3=27.5$ |
| $r_5=10000.00$ | | | |
| $r_6=<42.672$ | $d_5=3.7$ | $n_4=1.69895$ | $\nu_4=30.0$ |
| $r_7=50.88$ | $d_6=1.0$ | $n_5=1.51618$ | $\nu_5=64.2$ |
| $r_8=-43.756$ | $d_7=4.4$ | | |
| $r_9=142.270$ | $d_8=1.2$ | $n_6=1.62041$ | $\nu_6=60.3$ |
| $r_{10}=121.42$ | $d_9=39.538$ | | |
| $r_{11}=-48.713$ | $d_{10}=4.0$ | $n_7=1.62041$ | $\nu_7=60.3$ |
| $r_{12}=-148.14$ | $d_{11}=1.0$ | $n_8=1.62004$ | $\nu_8=36.3$ |
| $r_{13}=80.803$ | $d_{12}=10.877$ | | |
| $r_{14}=-1347.294$ | $d_{13}=4.7$ | $n_9=1.54814$ | $\nu_9=45.9$ |
| $r_{15}=32.37$ | $d_{14}=0.7$ | | |
| $r_{16}=-209.947$ | $d_{15}=10.4$ | $n_{10}=1.53172$ | $\nu_{10}=48.9$ |
| $r_{17}=44.615$ | $d_{16}=2.8$ | $n_{11}=1.7847$ | $\nu_{11}=26.1$ |
| $r_{18}=137.03$ | $d_{17}=38.1$ | | |
| $r_{19}=-71.03$ | $d_{18}=3.8$ | $n_{12}=1.62041$ | $\nu_{12}=60.3$ |
| $r_{20}=-31.35$ | $d_{19}=3.0$ | | |
| $r_{21}=40.00$ | $d_{20}=1.5$ | $n_{13}=1.744$ | $\nu_{13}=44.9$ |
| $r_{22}=-1595.00$ | $d_{21}=4.9$ | $n_{14}=1.69895$ | $\nu_{14}=30.0$ |
| $r_{23}=62.328$ | $d_{22}=0.1$ | | |
| $r_{24}=2466.00$ | $d_{23}=4.0$ | $n_{15}=1.70154$ | $\nu_{15}=41.1$ | and a range finder lens is characterized by:
a focal length $f = 50$mm, relative aperture F/0.8;
$r_1$ to $r_5$ inclusive are common to the photo-taking lens and the range finder lens,
wherein:

$r_1=174.94$

| | $d_1=7.5$ | $n_1=1.62299$ | $\nu_1=58.1$ |
|---|---|---|---|

| | | | |
|---|---|---|---|
| $r_2=-362.34$ | $d_2=0.1$ | | |
| $r_3=135.09$ | $d_3=13.5$ | $n_2=1.60311$ | $\nu_2=60.7$ |
| $r_4=-104.02$ | $d_4=2.0$ | $n_3=1.75520$ | $\nu_3=27.5$ |
| $r_5=10000.00$ | $dp_5=67.0$ | | |
| $rp_6=-28.00$ | $dp_6=1.0$ | $n_4=1.68893$ | $\nu_4=31.1$ |
| $rp_7=60.00$ | $dp_7=8.0$ | $n_5=1.691$ | $\nu_5=54.8$ |
| $rp_8=-28.989$ | $dp_8=0.1$ | | |
| $rp_9=22.00$ | $dp_9=4.0$ | $n_6=1.74443$ | $\nu_6=49.4$ |
| $rp_{10}=25.287$ | $dp_{10}=0.1$ | | |
| $rp_{11}=10.25$ | $dp_{11}=3.2$ | $n_7=1.80482$ | $\nu_7=46.4$ |
| $rp_{12}=12.104$ | | | | where $r_1, r_2 \ldots r_n$ represent the radii of curvature of the successive lens elements, $d_1, d_2 \ldots d_{n-1}$ the center thicknesses or the intervertex air spaces of the successive lens elements, $n_1, n_2 \ldots n_k$ the refractive indices of the respective glass materials for $d$-line, and $\nu_1, \nu_2 \ldots \nu_k$ the Abbe numbers of the respective glass materials.

* * * * *

UNITED STATES PATENT OFFICE
CERTIFICATE OF CORRECTION

Patent No. 3,756,697     Dated September 4, 1973

Inventor(s) SOICHI NAKAMURA

It is certified that error appears in the above-identified patent and that said Letters Patent are hereby corrected as shown below:

Column 1, line 29, change "mibht" to -- might --; line 36, change "reailized" to -- realized --.

Column 3, line 23, change "$r_{22}-1595.00$" to -- $r_{22}=-1595.00$ --.

Column 4, line 23, delete "A photo-taking lens is characterized by:"; line 35, change "$r_6=<42.672$" to -- $r_6=-42.672$ --; line 36, change "$n_5=1.51618$" to -- $n_5=1.5168$ --.

Signed and sealed this 9th day of April 1974.

(SEAL)
Attest:

EDWARD M.FLETCHER,JR.
Attesting Officer

C. MARSHALL DANN
Commissioner of Patents